(12) United States Patent
Elder

(10) Patent No.: US 9,051,943 B2
(45) Date of Patent: Jun. 9, 2015

(54) GAS TURBINE ENGINE HEAT EXCHANGER FINS WITH PERIODIC GAPS

(75) Inventor: James S. Elder, South Windsor, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 1168 days.

(21) Appl. No.: 12/939,252

(22) Filed: Nov. 4, 2010

(65) Prior Publication Data

US 2012/0114468 A1    May 10, 2012

(51) Int. Cl.
*F01D 25/12* (2006.01)
*F04D 29/58* (2006.01)
(Continued)

(52) U.S. Cl.
CPC .......... *F04D 29/584* (2013.01); *F02K 3/06* (2013.01); *F04D 29/5826* (2013.01); *F02C 7/143* (2013.01); *F05D 2260/22141* (2013.01); *F04D 29/5853* (2013.01); *F02C 7/141* (2013.01); *F01D 25/12* (2013.01); *F02K 3/115* (2013.01); *F02C 7/14* (2013.01); *F05D 2260/98* (2013.01); *Y02T 50/675* (2013.01)

(58) Field of Classification Search
CPC ............. F02K 3/115; F02K 3/02; F02K 3/04; F02K 3/06; F02C 7/14; F02C 7/141; F02C 7/143; F04D 29/584; F04D 29/5826; F04D 29/5853; F05D 2260/98; F05D 2260/22141; F01D 17/14; F01D 17/162; F01D 17/165; F01D 25/12; F01D 25/125
USPC .................. 415/144, 145, 175–178, 159–162; 184/104.1; 60/26, 782, 785, 39.08, 60/226.16, 266, 226.1; 165/80.3, 109.1, 165/185
See application file for complete search history.

(56) References Cited

U.S. PATENT DOCUMENTS 3,296,812 A * 1/1967 Cloudy ...................... 165/185
3,790,859 A    2/1974 Schraeder et al.
(Continued)

FOREIGN PATENT DOCUMENTS

CN    201297884 Y    8/2009
EP    0 092 033 A2    10/1983
(Continued)

OTHER PUBLICATIONS

United Kingdom Search Report for GB Application No. GB1120077.1 Jan. 31, 2012.
(Continued)

*Primary Examiner* — Christopher Verdier
(74) *Attorney, Agent, or Firm* — Carlson, Gaskey & Olds, P.C.

(57) ABSTRACT

A heat exchanger for a gas turbine engine is provided by a structure including an enclosed fluid cavity. The structure has opposing sides, and a set of fins is supported on one of the sides and arranged outside the cavity. The set of fins includes rows of discrete chevron fins separated by periodic gaps. In one application, the heat exchanger is arranged in a gas turbine engine. A core is supported relative to a fan case by structure. A fan duct is provided between a core nacelle and a fan case. The core includes a compressor section and a bleed cavity is provided within the core and is in fluid communication with the compressor section. The heat exchanger includes first and second sides opposite one another. The second side includes the set of rows of fins with the periodic gaps exposed to the bleed cavity.

15 Claims, 2 Drawing Sheets

(51) Int. Cl.
*F02K 3/115* (2006.01)
*F02C 7/14* (2006.01)
*F02K 3/06* (2006.01)
*F02C 7/143* (2006.01)
*F02C 7/141* (2006.01)

(56) References Cited

U.S. PATENT DOCUMENTS

| | | | |
|---|---|---|---|
| 4,254,618 | A | 3/1981 | Elovic |
| 5,709,263 | A | 1/1998 | Mira |
| 5,854,739 | A | 12/1998 | Steiner et al. |
| 6,234,239 | B1 | 5/2001 | Azar |
| 6,273,186 | B1 | 8/2001 | Ognibene et al. |
| 6,771,508 | B1 * | 8/2004 | Ghosh ............ 165/185 |
| 6,925,829 | B2 | 8/2005 | Wei |
| 7,337,831 | B2 | 3/2008 | Torii |
| 7,509,995 | B2 | 3/2009 | Bhatti et al. |
| 2001/0003302 | A1 | 6/2001 | Azar |
| 2003/0056943 | A1 | 3/2003 | Dessiatoun et al. |
| 2005/0150637 | A1 | 7/2005 | Tan et al. |
| 2005/0254208 | A1 | 11/2005 | Belady et al. |
| 2006/0096737 | A1 * | 5/2006 | Kimura ............ 165/80.3 |
| 2007/0284080 | A1 * | 12/2007 | Sun ............ 165/80.3 |
| 2008/0030957 | A1 | 2/2008 | Abul-Haj et al. |
| 2008/0074845 | A1 | 3/2008 | Sun et al. |
| 2008/0095611 | A1 | 4/2008 | Storage et al. |
| 2011/0303405 | A1 * | 12/2011 | Scott ............ 165/185 |

FOREIGN PATENT DOCUMENTS

| | | |
|---|---|---|
| FR | 2 356 898 A1 | 1/1978 |
| GB | 960 349 A | 6/1964 |
| GB | 1 044 952 A | 10/1966 |
| GB | 1 211 065 A | 11/1970 |
| GB | 2481129 | 12/2011 |
| JP | 2000121272 | 4/2000 |
| JP | 2001-332883 A * | 11/2001 ...... H05K 7/20 |
| JP | 2002 257488 A | 9/2002 |
| JP | 2001332838 | 11/2011 |
| RU | 2182692 | 5/2002 |

OTHER PUBLICATIONS

United Kingdom Search Report for GB Application No. GB1120079.7, Dec. 23, 2011.

* cited by examiner

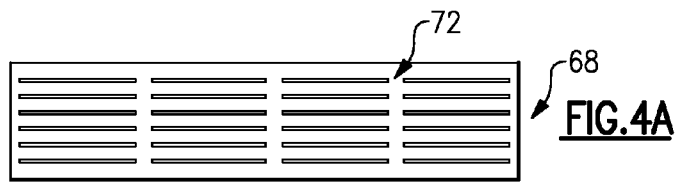
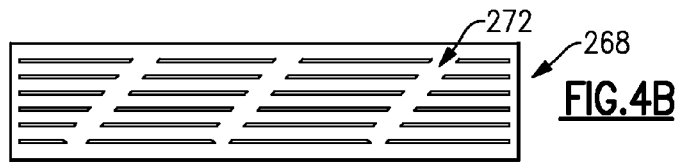
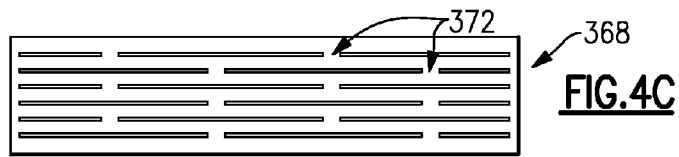
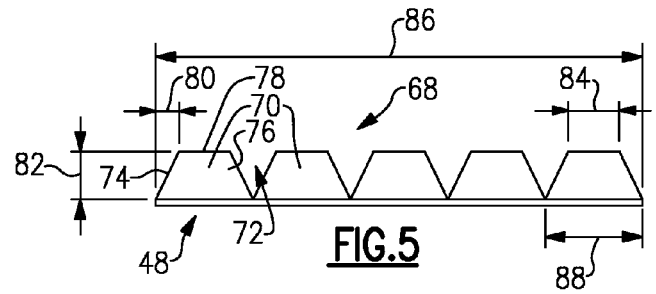
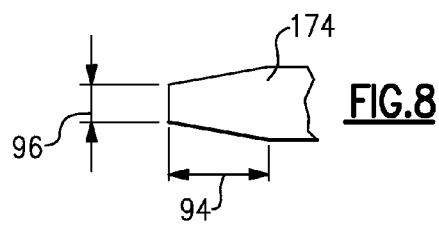
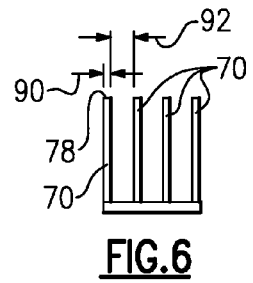

GAS TURBINE ENGINE HEAT EXCHANGER FINS WITH PERIODIC GAPS

BACKGROUND

This disclosure relates to a heat exchanger for use in a gas turbine engine. In one example, the heat exchanger is provided with fins arranged in a fan duct.

One example aircraft gas turbine engine transfers heat from the engine or generator oil circuit to the fan airflow through the use of heat exchangers. In one type of arrangement, multiple heat exchangers are supported by the core in a circumferential location relative to one another.

A common type of heat exchanger includes a structure having an oil cavity with fins extending into the fan duct to increase the amount of surface area exposed to the fan airflow. Another portion of the heat exchanger may include fins arranged in a compartment with irregular, turbulent flow, such as in a bleed cavity.

Typical construction is provided by machined aluminum halves brazed to one another. Traditional fin heat exchangers utilize fins with a constant height, length and thickness to transfer heat to the air flowing between the fins. Fins typically have a rectangular shape with a uniform cross-section. Sharp corners of the fins may be relieved to reduce the potential for damage during handling and service.

SUMMARY

A heat exchanger for a gas turbine engine provided by a structure including an enclosed fluid cavity. The structure has opposing sides, and a set of fins is supported on one of the sides and arranged outside the cavity. The set of fins includes rows of discrete chevron fins separated by periodic gaps.

In one application, the heat exchanger is arranged in a gas turbine engine. A core is supported relative to a fan case by structure, such as flow exit guide vanes or, for example, struts. A fan duct is provided between a core nacelle and a fan case. The core includes a compressor section and a bleed cavity is provided within the core and is in fluid communication with the compressor section. The heat exchanger includes first and second sides opposite one another. The second side includes the set of rows of fins with the periodic gaps exposed to the bleed cavity.

BRIEF DESCRIPTION OF THE DRAWINGS

The disclosure can be further understood by reference to the following detailed description when considered in connection with the accompanying drawings wherein:

FIG. 4A-4C are top elevational views of example fin arrangements.

FIG. 5 is a side elevational view of a fin on the second side, shown in the heat exchanger in FIG. 4A.

FIG. 6 is an end view of the fins provided on the second side.

FIG. 7 is a side elevational view of another fin on the second side.

FIG. 8 is an enlarged top elevational view of an example leading edge illustrated on the fin shown in FIG. 5.

DETAILED DESCRIPTION

Figure 1:
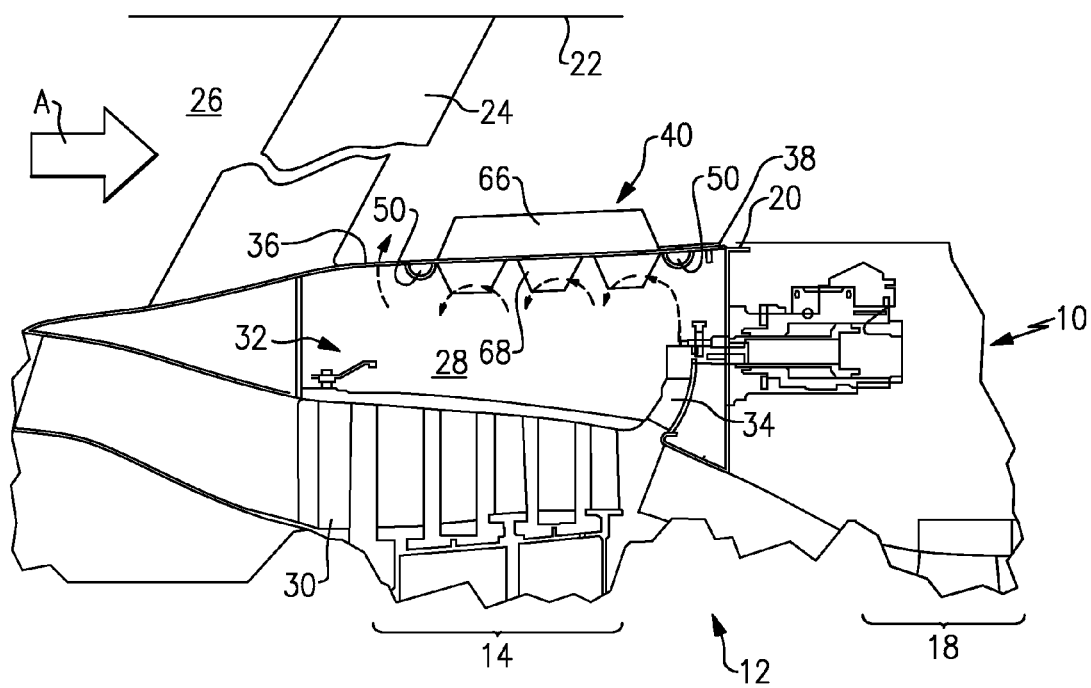
FIG. 1 is a partial schematic view of an example gas turbine engine with an example heat exchanger.

A portion of a gas turbine engine 10 is schematically shown in FIG. 1. The engine 10 includes a core 12 having compressor, combustor and turbine sections. The core 12 is supported relative to a fan case 22 by flow exit guide vanes 24. The core 12 includes a core nacelle 20 surrounding the compressor, combustor and turbine sections. The compressor section includes a low pressure compressor 14 and a high pressure compressor 18. A fan duct 26 is provided between the fan case 22 and core nacelle 20. A fan (not shown) is driven by the core 12 and produces an airflow A through the fan duct 26.

A bleed cavity 28 is provided within the core nacelle 20 and is arranged radially outward of the compressor section. In one example, a variable stator vane 30 is provided in the compressor section. An actuation system component 32 is arranged within the bleed cavity 28 for actuating the variable stator vanes 30 during engine operation. A bleed cavity inlet 34 communicates bleed air from the compressor section to the bleed cavity 28. Fluid flows from the bleed cavity inlet 34 through the bleed cavity 28 and exits a bleed cavity outlet 36 to the fan duct 26.

Figure 2:
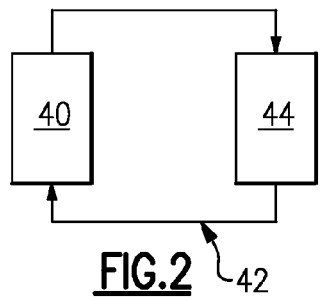
FIG. 2 is a schematic of a gas turbine engine cooling circuit utilizing the heat exchanger.

In one example, the core nacelle 20 includes an aperture 38 within which a fluid heat exchanger 40 is mounted. In one example, the heat exchanger 40 is part of an oil cooling circuit 42 that cools oil from a heat load 44, such as an oil bearing compartment, as schematically illustrated in FIG. 2.

Figure 3:
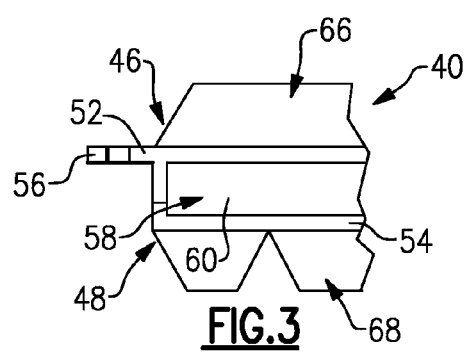
FIG. 3 is a partial cross-sectional view of an example heat exchanger, also shown in FIG. 2.

Referring to FIGS. 1 and 3, the heat exchanger 40 is provided by structure that includes first and second opposing sides 46, 48. An oil cavity 58 is provided between first and second portions 52, 54 that are brazed to one another. In one example, internal fins 60 are provided in the cavity 58. In one example, the first portion 52 provides a mounting flange 56 for securing the heat exchanger 40 to the core nacelle 20 and within the aperture 38. The heat exchanger 40 may also support oil manifolds 50 that communicate oil between the heat load 44 and the cavity 58.

First and second sets of fins 66, 68 are respectively provided on the first and second sides 46, 48 and extending axially in the direction of airflow A. The first set of fins 66 is arranged in the fan duct 26, and the second set of fins 68 is arranged in the bleed cavity 28, which includes irregular, turbulent flow as indicated by the arrows. It should be understood that the first set of fins 66 is optional.

The second set of fins 68 include tapered fins 70 or chevrons, for examples, of a generally trapezoidal shape, separated by periodic gaps 72 to provide breaks between the fins, which enables the turbulent flow within the bleed cavity 28 to better penetrate the second set of fins 68 for improved heat transfer. FIGS. 4A-4C illustrate different gap configurations. FIG. 4A depicts the gaps 72 aligned with one another between rows of the set of fins 68 in a direction perpendicular to the rows. FIG. 4B depicts the gaps 272 aligned with one another between the rows of the set fins 268 in an angled orientation to the rows. FIG. 4C depicts the gaps 372 offset and alternating with one another between the rows of the set of fins 368.

Each fin 70 tapers radially outwardly from and generally perpendicular to the second side 48 as they extend in a direction away from the fan (not shown). The fins 70 include leading and trailing edges 74, 76 opposite one another with the leading edge 74 facing the airflow A and forward of the trailing edge 76. In one example, an outer edge 78 extends from the leading edge 74 to the trailing edge 76 and is generally linear, for example.

The fins 70 have a height 82 of approximately 1.2 inch (28.8 mm), for example, and extend a length 86 of approximately 10.0 inch (254.0 mm), for example. Each fin 70 includes a base width 88, which is approximately 2.0 inch (50.8 mm), for example. In the example, the bases of the fins 70 adjoin one another to maximize conduction from the cavity 58. The outer edge 78 has a width 84 of approximately 1.0 inch (25.4 mm) in one example and has an offset 80 from the end of the fin base of 0.5 inch (12.5 mm), for example. Referring to FIG. 6, the rows of fins 70 have a spacing 92 from one another 0.12 inch (3.0 mm), for example. In one example, the fins 70 have a thickness 90 of 0.06 inch (1.5 mm).

In the example shown in FIGS. 7 and 8, at least one of the leading and trailing edges, and in the illustrated example, both the leading and trailing edges 174, 176 taper or are chamfered in cross-section in the axial direction. As illustrated in FIG. 8, the tapered surfaces are generally unparallel and flat, having a length 94 of 0.2 inch (5.1 mm), for example, and taper to a thickness 96 of 0.01 inch (0.3 mm). Another example leading edge may include rounded lateral surfaces.

Although an example embodiment has been disclosed, a worker of ordinary skill in this art would recognize that certain modifications would come within the scope of the claims. The dimensions provided above are exemplary. In one example, the dimensions may vary by 40% less than the specified dimension up to the specified dimension. For that reason, the following claims should be studied to determine their true scope and content.

What is claimed is:

1. A gas turbine engine comprising:
a core supported relative to a fan case by the core including a core nacelle, and a fan duct provided between the core nacelle and the fan case, wherein the core includes a compressor section and a bleed cavity is provided within the core and in fluid communication with the compressor section;
an actuation system component arranged within the bleed cavity, the actuation system component configured to actuate variable stator vanes in the compressor section; and
a heat exchanger including first and second sides opposite one another, the second side including a set of rows of fins exposed to the bleed cavity, the set of fins having gaps between discrete fins in a given row.

2. The gas turbine engine according to claim 1, wherein the fins include an outer edge adjoining leading and trailing edges, and the fins include a generally trapezoidal shape provided by the leading and trailing edges and the outer edge.

3. The gas turbine engine according to claim 1, comprising an oil cooling circuit including the heat exchanger and a heat load, the heat exchanger including an oil cavity between the first and second sides.

4. The gas turbine engine according to claim 3, wherein the oil cavity has internal fins oriented in an axial direction that is the same direction in which the fins extend.

5. The gas turbine engine according to claim 1, wherein the heat exchanger includes an enclosed fluid cavity, and the set of fins is supported on the second side and arranged outside the cavity, the set of fins including rows of discrete chevron fins separated by periodic gaps.

6. The gas turbine engine according to claim 5, wherein the fins include an outer edge adjoining leading and trailing edges, and the outer edge of each row is generally linear.

7. The gas turbine engine according to claim 6, wherein the fins include a generally trapezoidal shape provided by the leading and trailing edges and the outer edge.

8. The gas turbine engine according to claim 7, wherein the leading and trailing edges taper toward one another, and bases of the fins adjoin one another at a location in which the adjoining fins are supported by the one side.

9. The gas turbine engine according to claim 7, wherein at least one of the leading and trailing edges include a tapered cross-section in an axial direction.

10. The gas turbine engine according to claim 9, wherein the tapered cross-section includes unparallel flat lateral surfaces.

11. The gas turbine engine according to claim 5, wherein the cavity is arranged between the first and second sides.

12. The gas turbine engine according to claim 5, wherein the other side includes a set of fins having rows of fins without periodic gaps.

13. The gas turbine engine according to claim 5, wherein the gaps are unaligned between adjoining rows.

14. The gas turbine engine according to claim 5, wherein the gaps are aligned with one another between adjoining rows.

15. The gas turbine engine according to claim 14, wherein the gaps are aligned with one another between rows in a direction perpendicular to the rows.

\* \* \* \* \*